United States Patent [19]
Katsumata et al.

[11] Patent Number: 5,765,935
[45] Date of Patent: Jun. 16, 1998

[54] VEHICULAR HEAD LAMP

[75] Inventors: Toshiyuki Katsumata; Michinobu Kibayashi, both of Shimizu, Japan

[73] Assignee: Koito Manufacturing Co., Ltd., Tokyo, Japan

[21] Appl. No.: 561,466

[22] Filed: Nov. 21, 1995

[30] Foreign Application Priority Data

Nov. 22, 1994 [JP] Japan .................. 6-311269

[51] Int. Cl.$^6$ .................................. B60Q 1/06
[52] U.S. Cl. ......................... 362/66; 362/421
[58] Field of Search .................. 362/66, 421, 61, 362/80

[56] References Cited

U.S. PATENT DOCUMENTS

| | | | |
|---|---|---|---|
| 4,843,531 | 6/1989 | Mochizuki et al. | 362/421 |
| 5,270,907 | 12/1993 | Lisak | 362/66 |
| 5,331,519 | 7/1994 | Fujino | 362/66 |
| 5,508,896 | 4/1996 | Suehiro et al. | 362/66 |
| 5,541,815 | 7/1996 | Nakamura | 362/66 |

Primary Examiner—Ira S. Lazarus
Assistant Examiner—Nhat-Hang H. Lam
Attorney, Agent, or Firm—Sughrue, Mion, Zinn, Macpeak & Seas, PLLC

[57] ABSTRACT

A vehicular head lamp has a head lamp unit tiltabaly attached to a vehicle body by means of two distance adjusters including adjusting shafts and one rotational support section. The two adjusting shafts are coupled to the vehicle body via a bracket of a synthetic resin which has two nuts that are to be respectively fitted over the two adjusting shafts, and projections protruding toward the vehicle body are formed on nut-forming portions and are engaged with attachment holes formed in the vehicle body to secure the bracket to the vehicle body.

16 Claims, 17 Drawing Sheets

VEHICULAR HEAD LAMP

BACKGROUND OF THE INVENTION

1. Field of the Invention

The present invention relates to a novel vehicular head lamp. More particularly, this invention provides a novel vehicular head lamp whose head lamp unit is tiltably attached to the body of a vehicle by two distance adjusters including an adjusting shaft and a single rotational support section and which is designed to facilitate the attachment of nuts to be fitted over the adjusting shafts to the vehicle body, thus ensuring an improved operability.

2. Description of the Related Art

One conventional type of vehicular head lamp has its head lamp unit tiltably attached to the body of a vehicle by two distance adjusters including an adjusting shaft and a single rotational support section.

As shown in FIG. 17, a head lamp unit a is tiltably supported on the body of a vehicle (not shown) by a single rotational support section b and two distance adjusters c. Each distance adjuster c has an adjusting shaft d, which has one end rotatably supported on the head lamp unit a and a nut f which is fitted over the engage shaft portion e of the adjusting shaft d. The nuts f are to be attached to the unillustrated vehicle body.

As an operation section formed at the other end portion of each adjusting shaft d is manipulated, the adjusting shaft d is rotated to change the position of the adjusting shaft d where the associated nut f is fitted. As a result, the distances between the portions of the head lamp unit a where the one-end portions of the adjusting shafts d are coupled and the nuts f, i.e., the distances between the mentioned portions of the head lamp unit a and the vehicle body, are changed, thereby tilting the head lamp unit a with respect to the vehicle body.

The nuts f for the above-described conventional vehicular head lamp which are fitted over the adjusting shafts d are independent of each other. If the attachment holes formed in the vehicle body for the attachment of those nuts f are circular, each nut f turns together with the associated adjusting shaft d when this shaft d is turned. Therefore, the distance between the head lamp unit a and the vehicle body cannot be adjusted. In this respect, the attachment holes should have non-circular shapes, and the nuts f should also have non-circular outer shapes matching with the shapes of the attachment holes.

If the shapes of the attachment holes and the outer shapes of the nuts f are made non-circular, the nuts f should be attached to the head lamp unit a from the proper direction, thus deteriorating the efficiency of the assembling work.

Since two nuts f are attached separately, the number of attaching steps increases, further deteriorating the assembling efficiency.

SUMMARY OF THE INVENTION

Accordingly, it is an objective of the present invention to provide a vehicular head lamp which includes two adjusting shafts to be coupled to a vehicle body via a bracket of a synthetic resin having two nuts that are to be respectively fitted over the two adjusting shafts, and projections formed on nut-forming portions and protruding toward the vehicle body, the projections being engaged with attachment holes formed in the vehicle body to secure this bracket to the vehicle body.

Therefore, the attachment of the vehicular head lamp of this invention to the body of a vehicle merely requires the attachment of a single bracket to the vehicle body, thus ensuring higher assembling efficiency. Further, as the two projections are attached to the vehicle body, the nuts do not turn in accordance with the rotation of the adjusting shafts even if the attachment holes are not made non-circular. Furthermore, the bracket can be attached to the vehicle body as long as the rough, not precise, positional relation between them is grasped, thus ensuring significantly remarkable assembling efficiency.

BRIEF DESCRIPTION OF THE DRAWINGS

The features of the present invention that are believed to be novel are set forth with particularity in the appended claims. The invention, together with the objects and advantages thereof, may best be understood by reference to the following description of the presently preferred embodiments together with the accompanying drawings.

DETAILED DESCRIPTION OF THE PREFERRED EMBODIMENT

Figure 1:
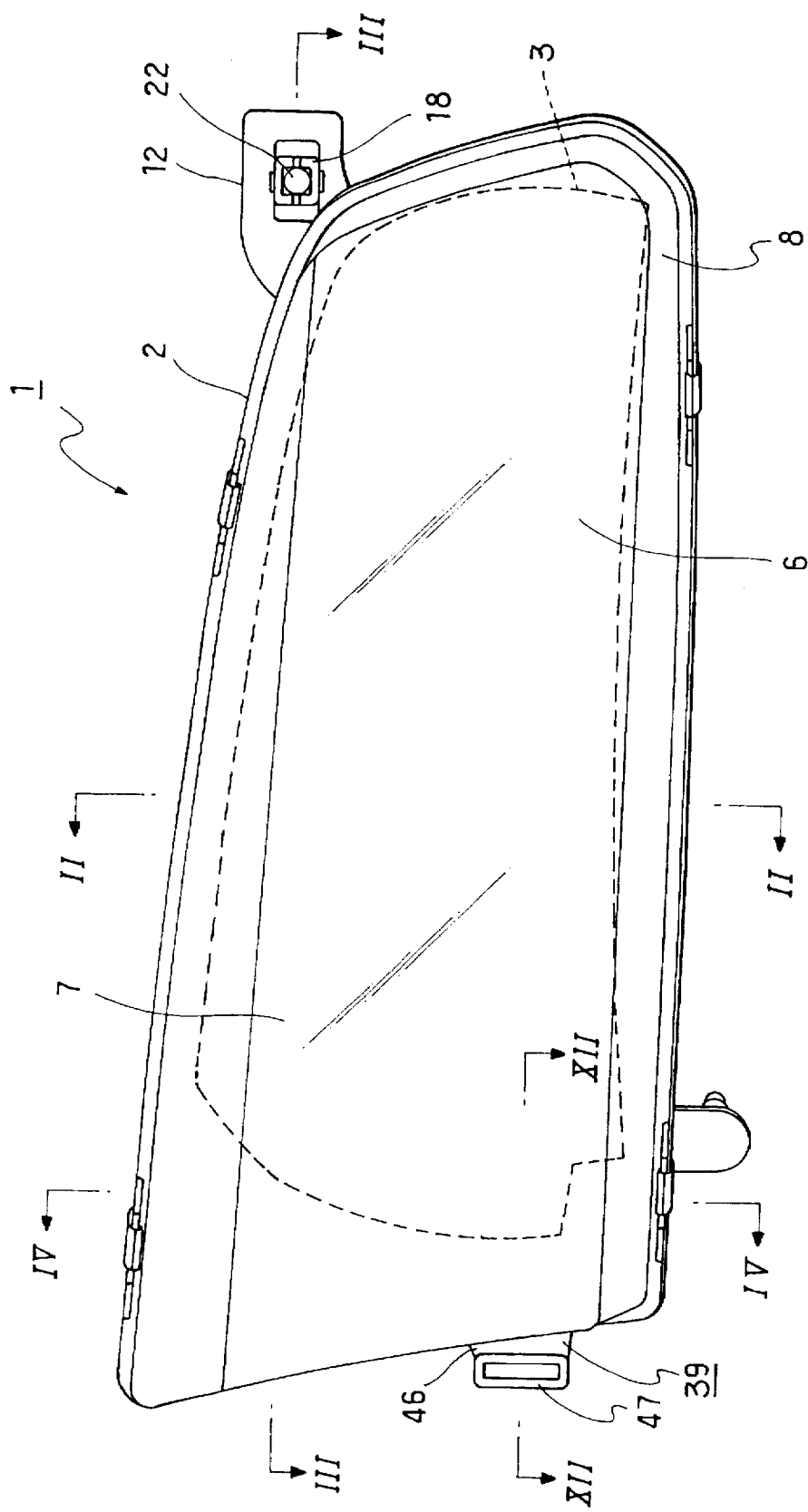
FIG. 1 is a front view showing a vehicular head lamp according to one embodiment of this invention together with FIGS. 2 through 12.
Figure 2:
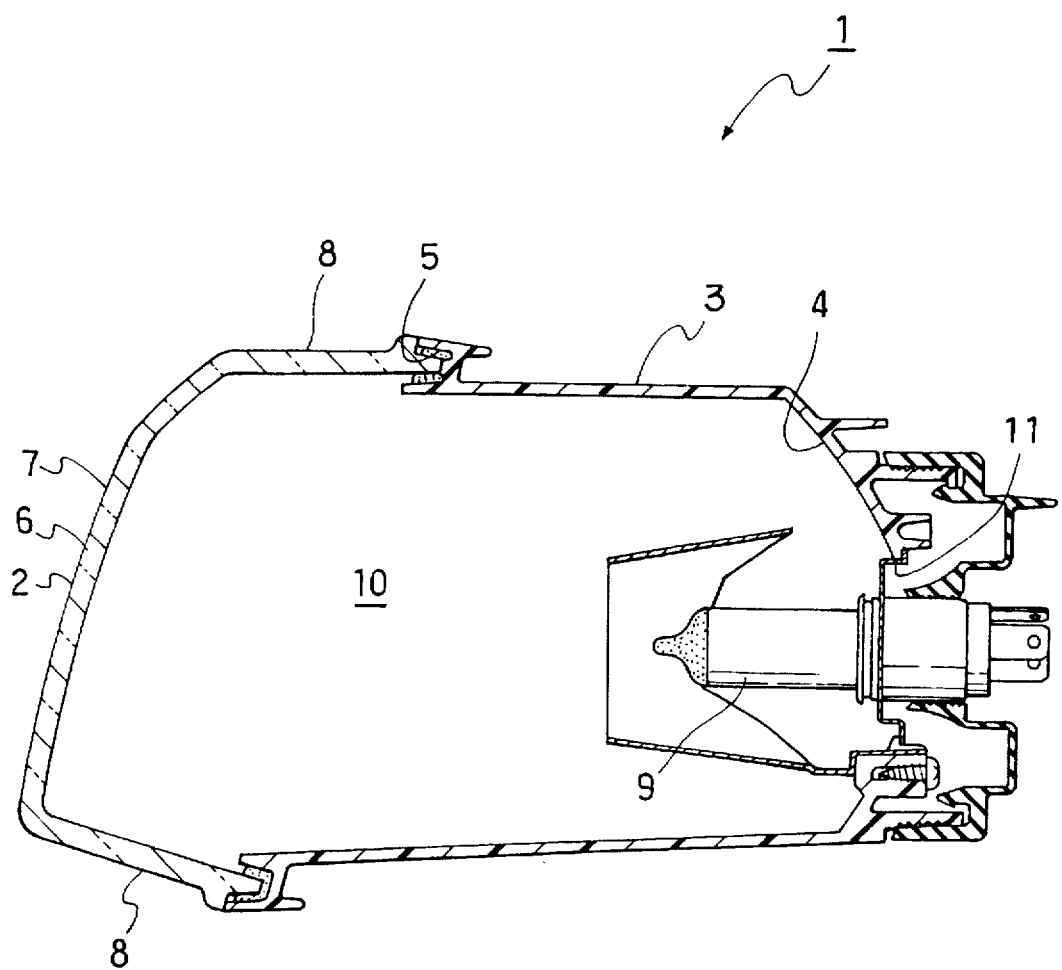
FIG. 2 is a cross-sectional view taken along the line II—II in FIG. 1.
Figure 3:
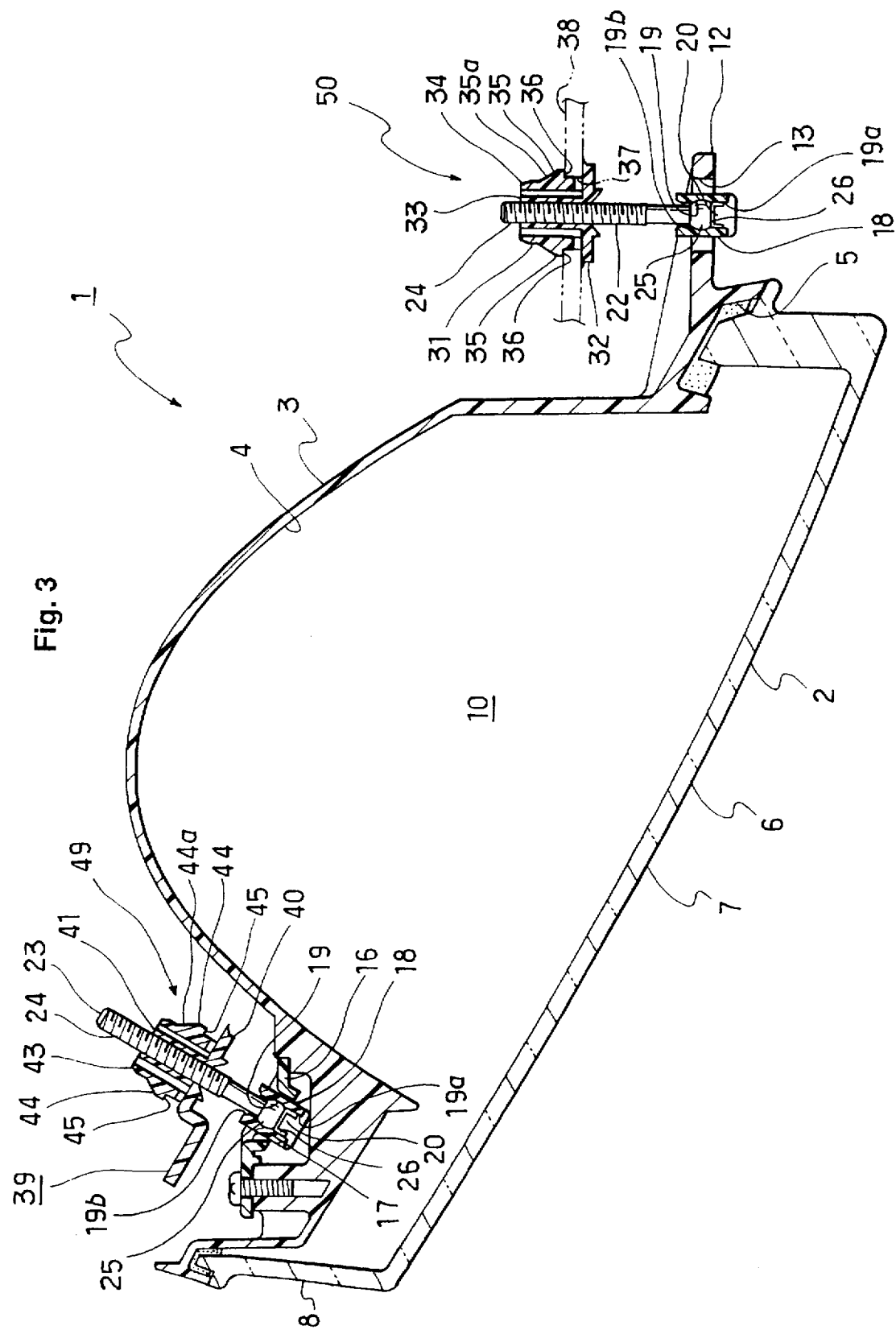
FIG. 3 is a cross-sectional view taken along the line III—III in FIG. 1.
Figure 4:
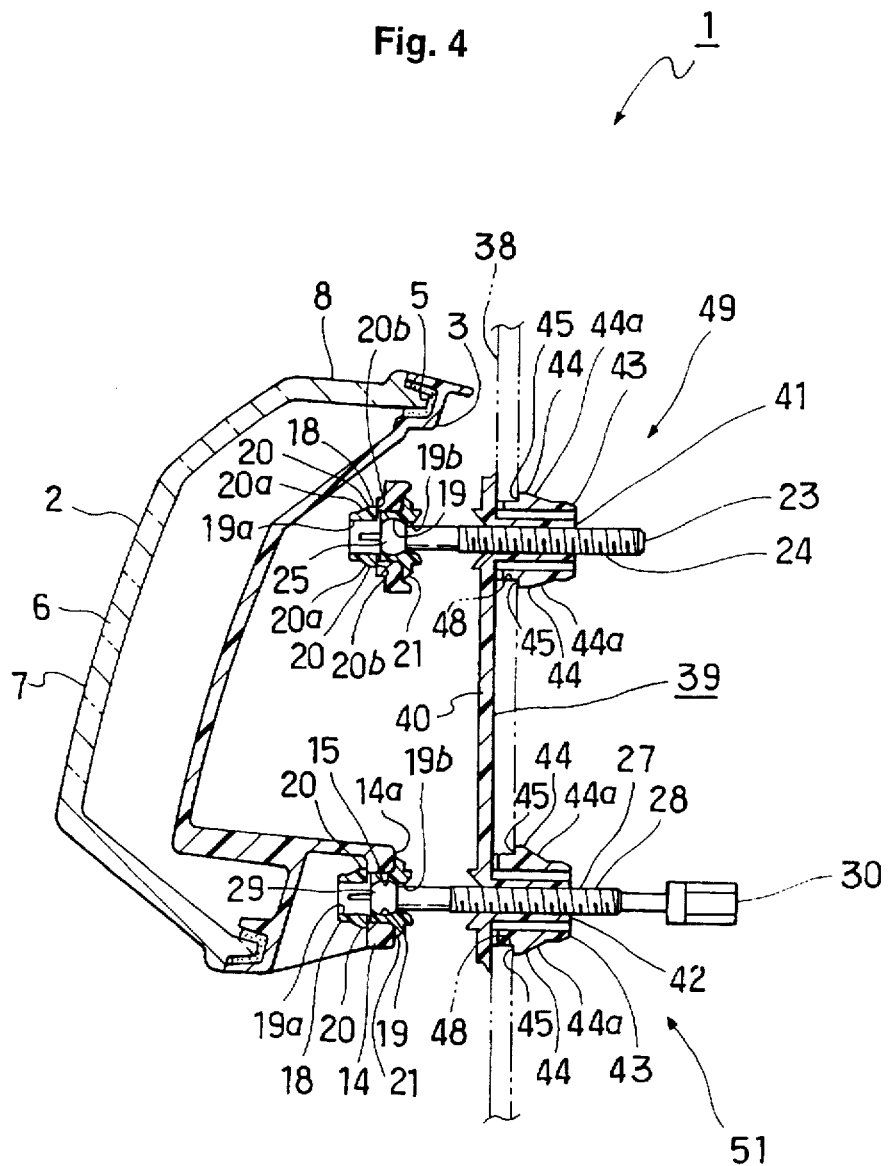
FIG. 4 is a cross-sectional view taken along the line IV—IV in FIG. 1.
Figure 5:
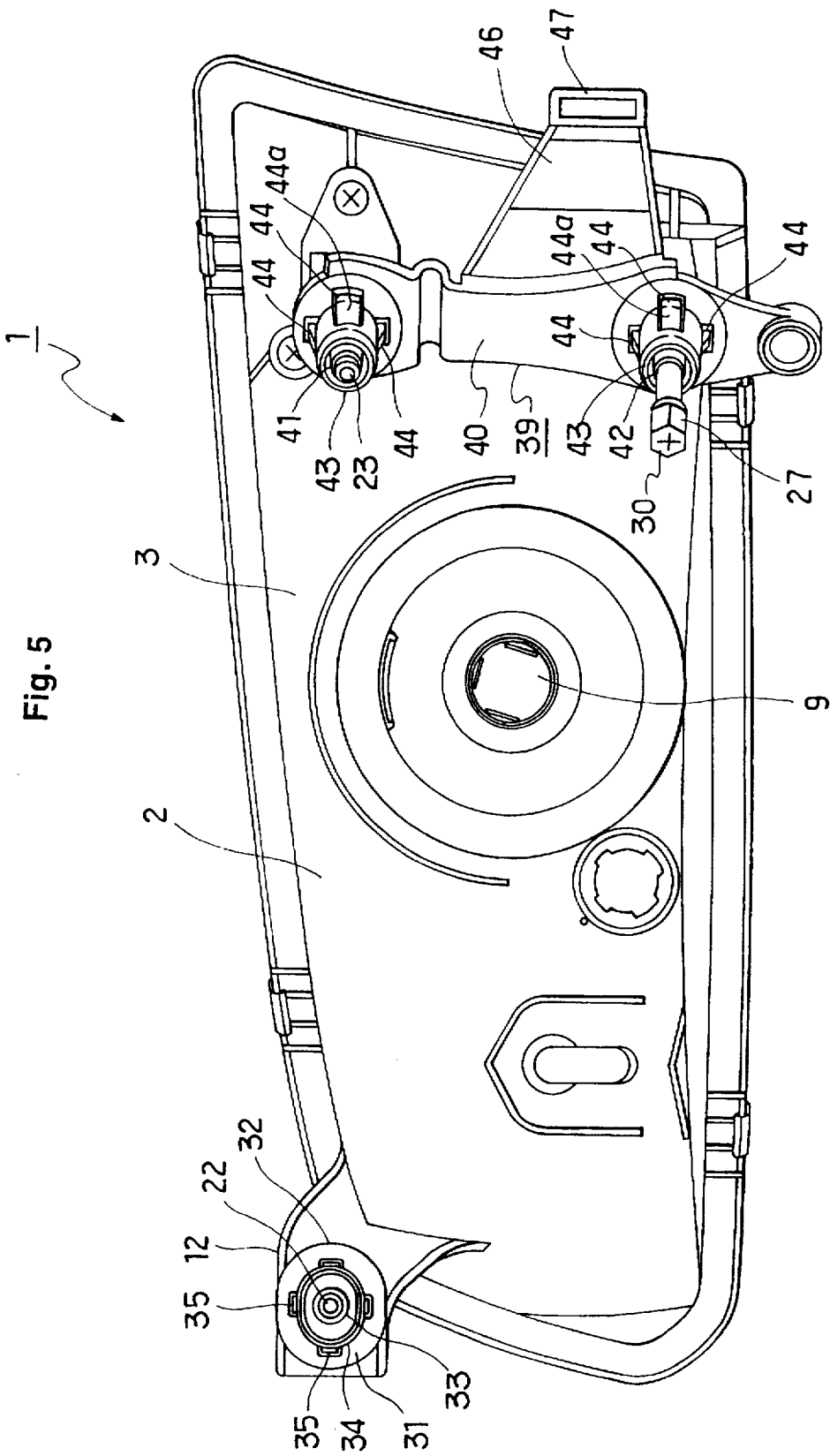
FIG. 5 is a rear view of this vehicular head lamp.
Figure 6:
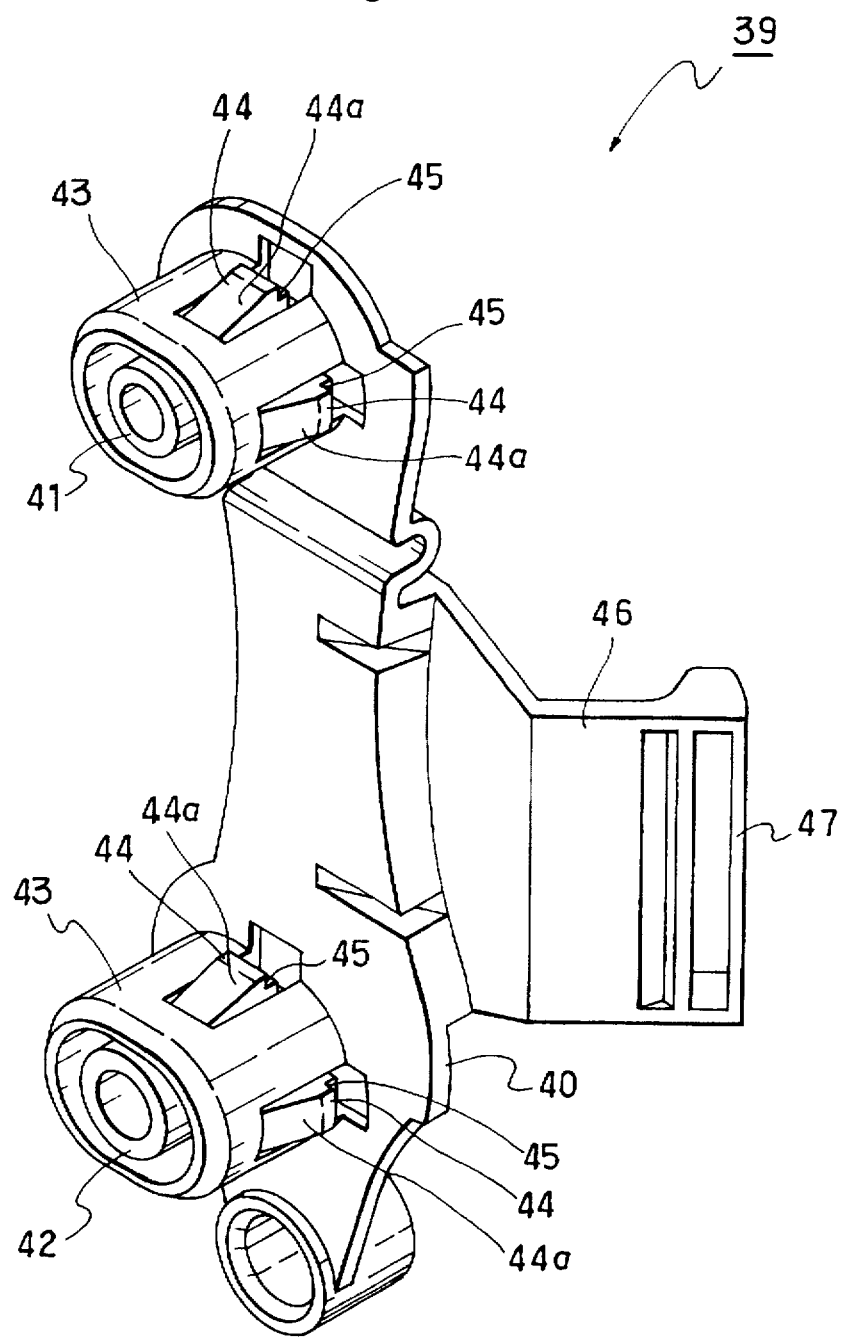
FIG. 6 is an enlarged perspective view of a bracket.
Figure 7:
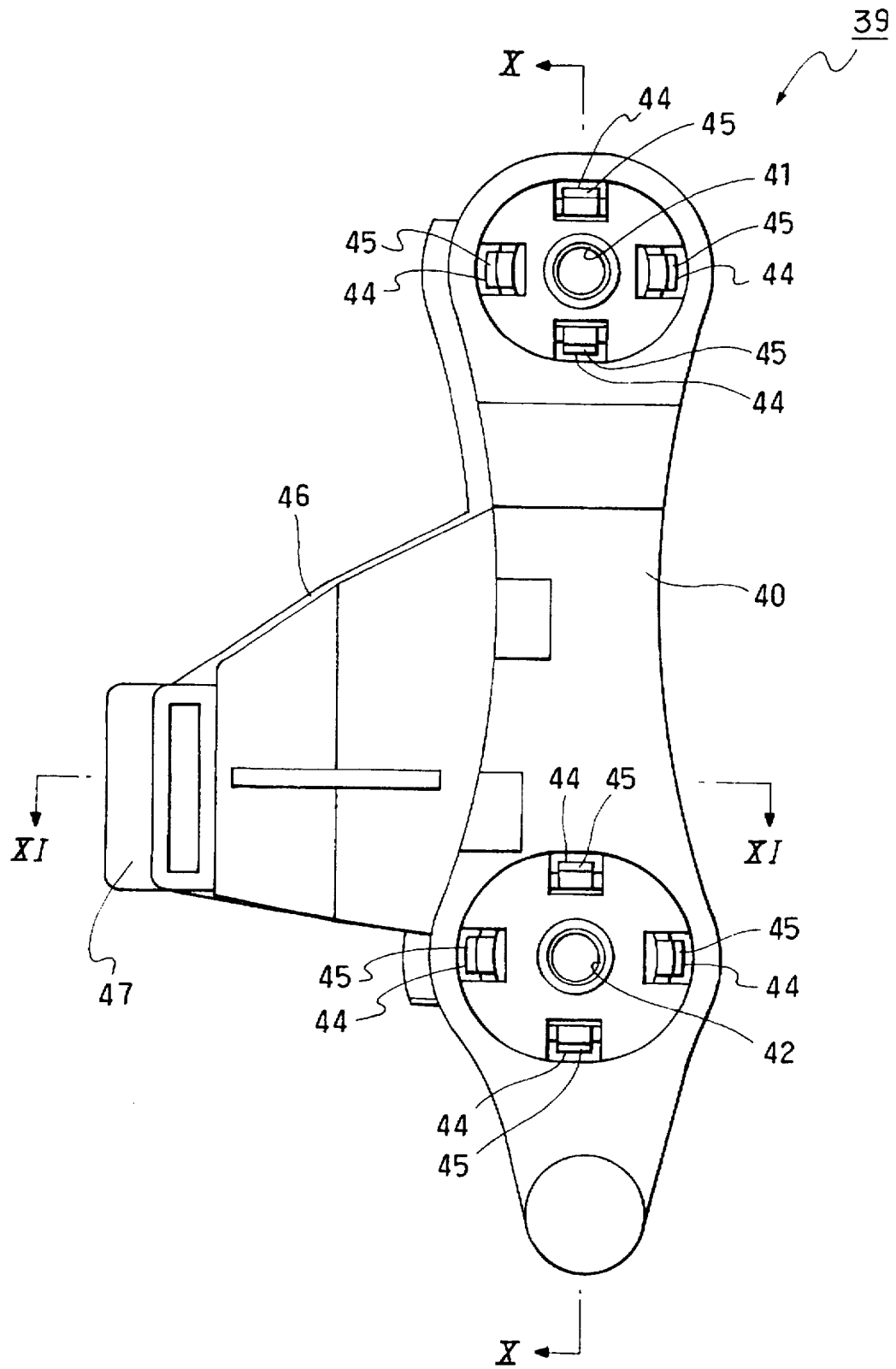
FIG. 7 is an enlarged front view of the bracket.
Figure 8:
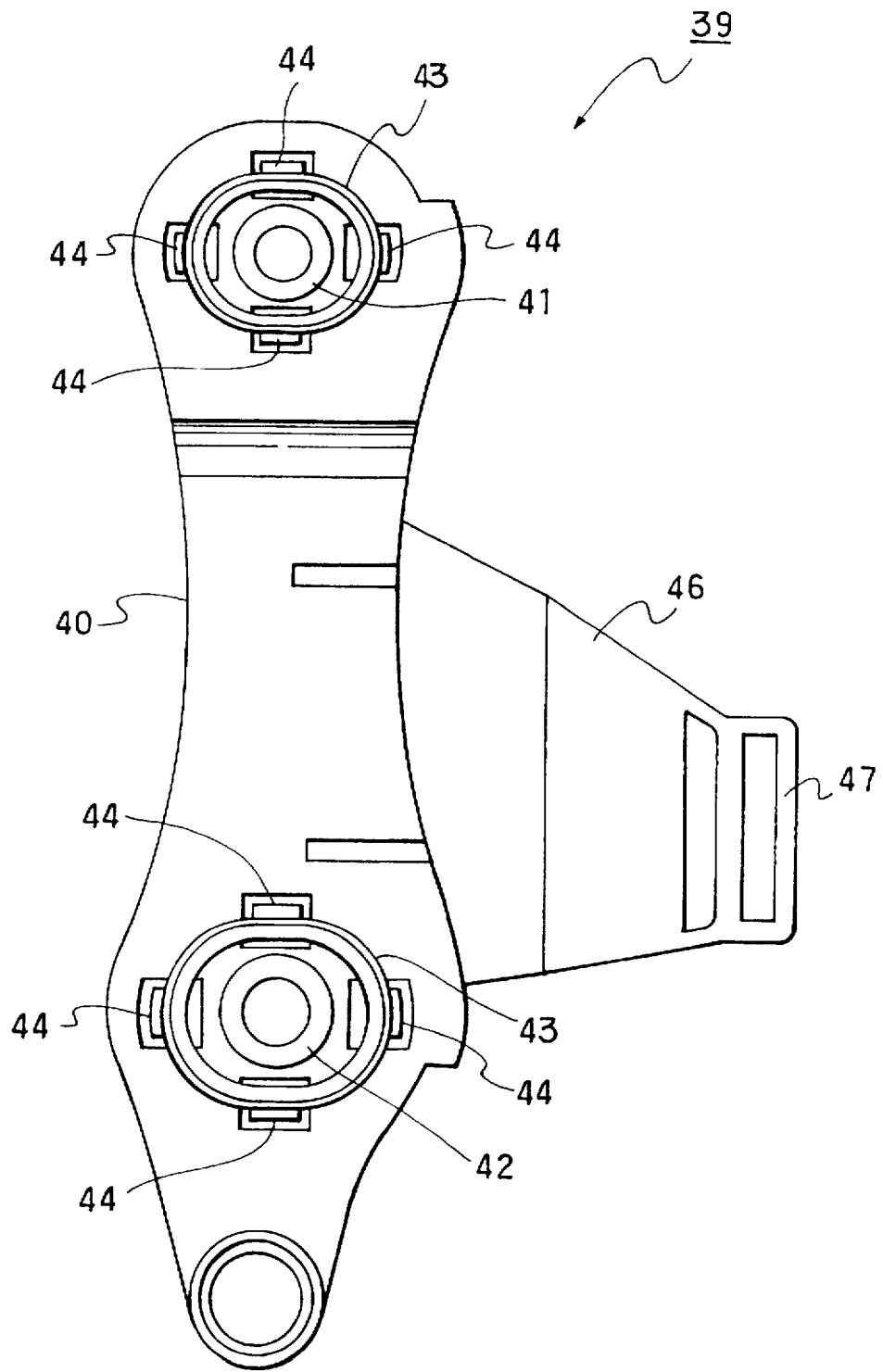
FIG. 8 is an enlarged rear view of the bracket.
Figure 9:
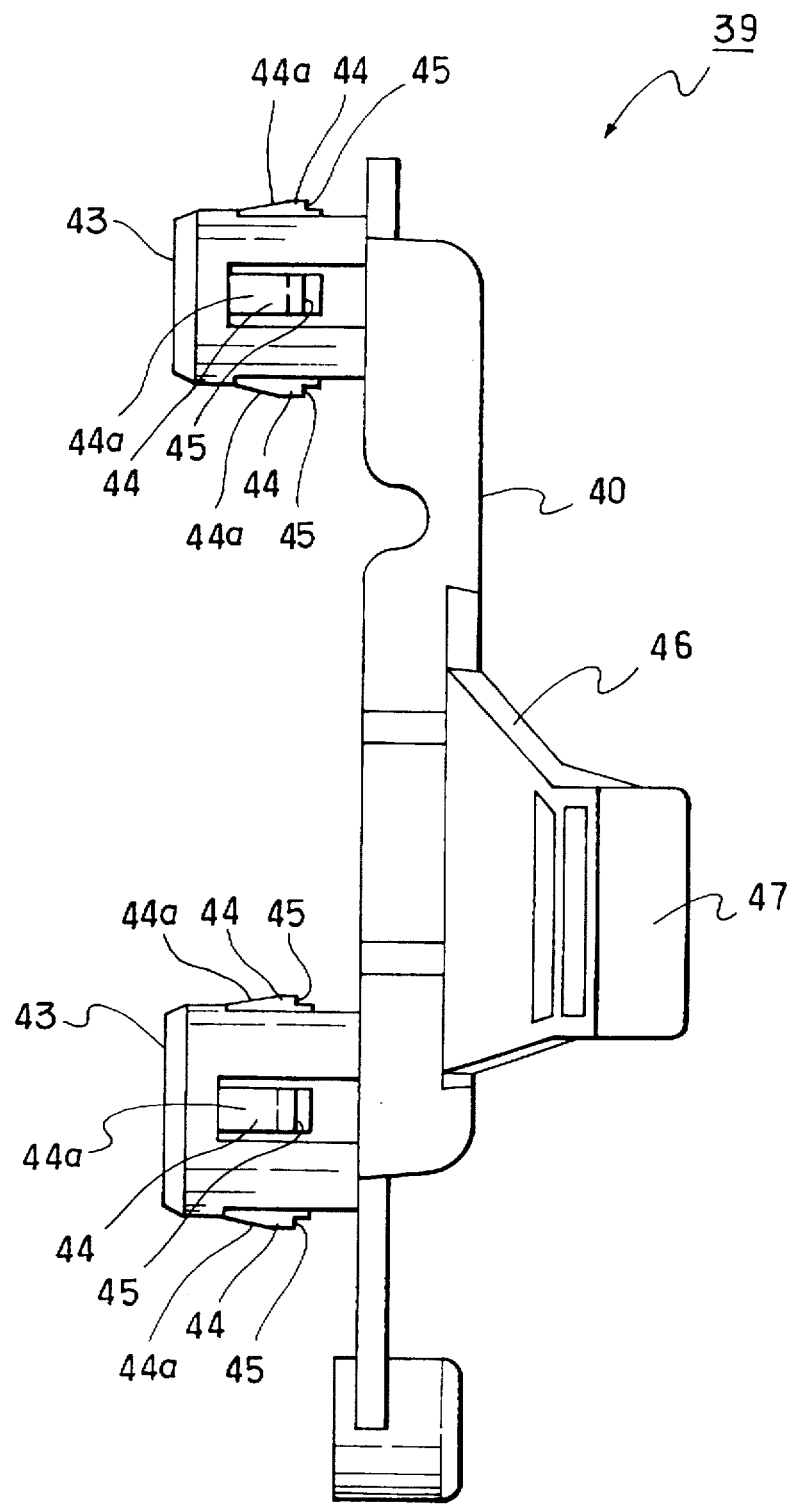
FIG. 9 is an enlarged side view of the bracket.
Figure 10:
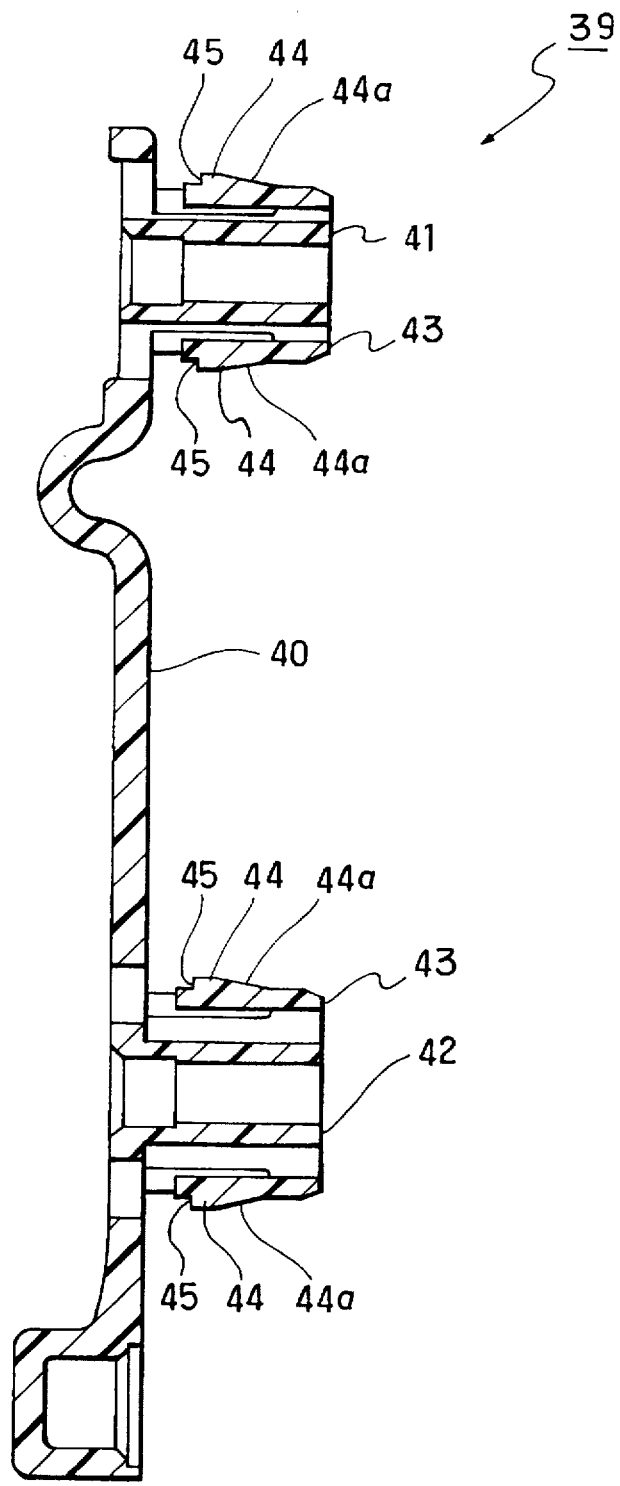
FIG. 10 is a cross-sectional view taken along the line X—X in FIG. 7.
Figure 11:
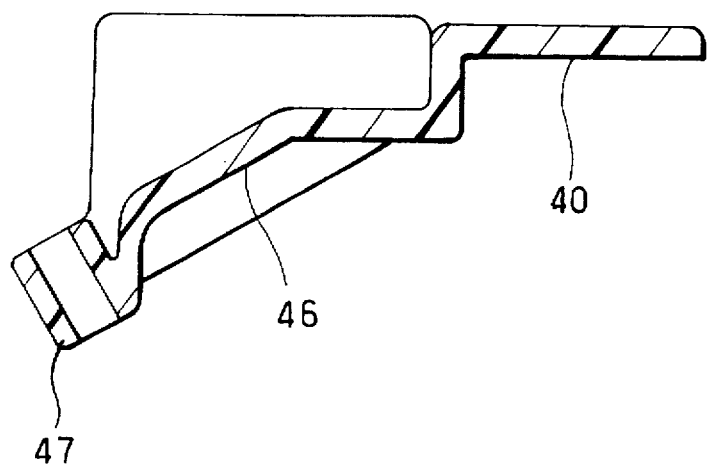
FIG. 11 is a cross-sectional view taken along the line XI—XI in FIG. 7.
Figure 12:
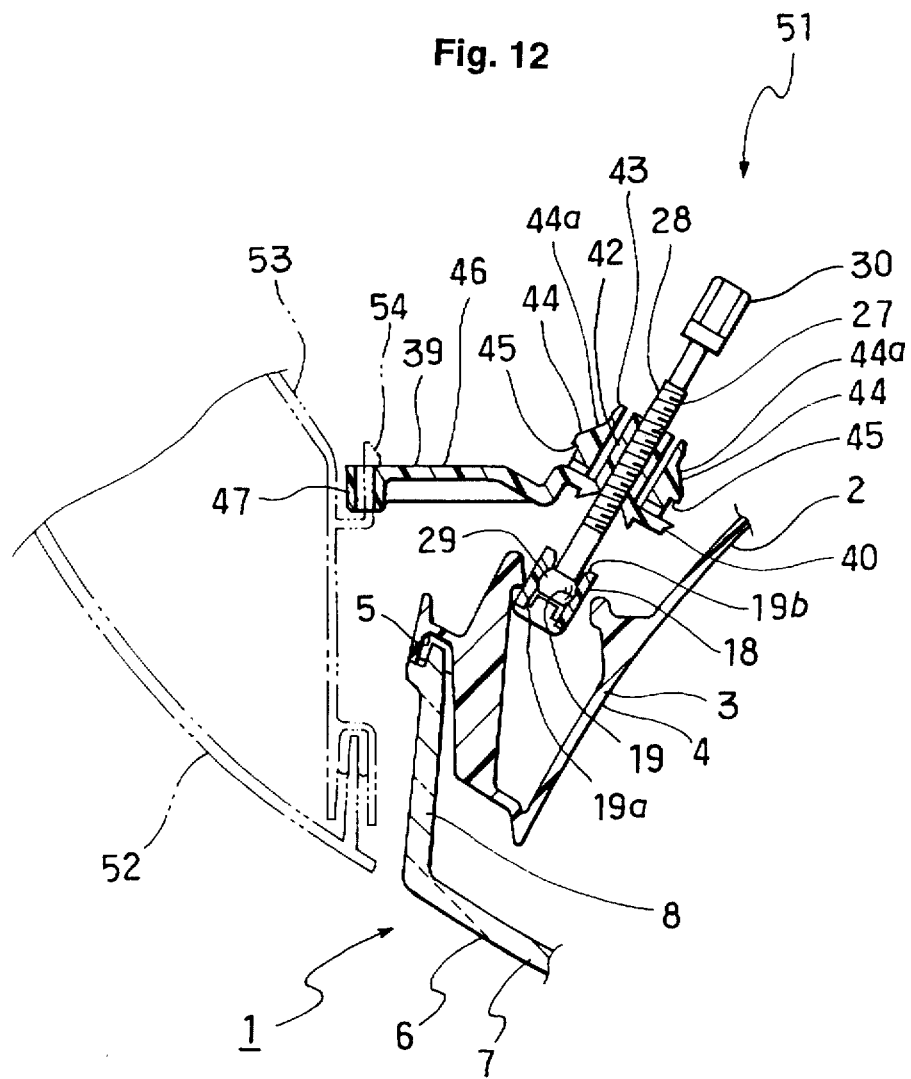
FIG. 12 is a cross-sectional view taken along the line XII—XII in FIG. 1.

A vehicular head lamp according to a preferred embodiment of the present invention will now be described with reference to the accompanying drawings.

A vehicular head lamp 1 has a head lamp unit 2 and a lamp body 3 of a synthetic resin. The lamp body 3 has a recess 4, which is open frontward and has its inner surface subjected to a reflection process to serve as a reflection surface.

An engage groove 5 open frontward is formed in the periphery of the front end portion of the lamp body 3.

A lens 6 comprises a front face portion 7 which covers the front face of the lamp body 3 and a side face portion 8 protruding rearward from the periphery of the front face portion 7. The front face portion 7 and the side face portion 8 are integrally formed of a transparent material. The rear end portion of the side face portion 8 of the lens 6 is fitted into the engage groove 5 of the lamp body 3 and secured there by an adhesive or the like.

An electric bulb 9 is disposed in a lamp space 10 defined by the lamp body 3 and the lens 6, and is detachably attached to a bulb mounting hole 11 formed in the rear portion of the lamp body 3.

An attaching piece 12 is integrally provided on the lamp body 3 in such a way as to protrude rightward from the upper end portion of the right edge of the front end portion of the lamp body 3 as viewed from the front thereof. A rectangular attachment hole 13 is formed in the attaching piece 12.

An attaching piece 14 is integrally provided on the lamp body 3 in such a way as to protrude rearward from the back of the lower end portion of the left side portion of the lamp body 3. A rectangular attachment hole 15 is formed in a rear face 14a of the attaching piece 14 which nearly faces frontward and rearward of the attaching piece 14.

An attaching piece 16 is secured by a screw to the back of the upper end portion of the left side portion of the lamp body 3. A rectangular attachment hole 17 is formed in the attaching piece 16.

Three receiving bodies 18, made of a synthetic resin, are respectively supported on the three attaching pieces 12, 14 and 16 of the lamp body 3.

Each receiving body 18 is formed of a synthetic resin with elasticity such as nylon 6, and have an approximately cylindrical shape. A receiving recess 19 having a concave shape is formed in the middle portion of the receiving body 18, and has openings 19a and 19b at the front and back.

Two engage projections 20 are protrusively provided at two opposite side portions of each receiving body 18 at the front end thereof. Each engage projection 20 has a slit formed along the three edges thereof excluding the front edge, so that the engage projection 20 is bendable in the direction perpendicular to the axis of the receiving body 18. Each engage projection 20 has an inclined surface 20a facing obliquely frontward and an engage face 20b continuous to the rear end of the inclined surface 20a and facing in the direction perpendicular to the axial direction of the associated receiving body 18. Abutting pieces 21 are protrusively provided at the mentioned two side portions apart rearward from the engage faces 20b of the engage projections 20.

One of the receiving bodies 18 is mounted in the rectangular attachment hole 13 in the following manner. The front end portion of the receiving body 18 is inserted in the attachment hole 13 from the rear direction thereof. As the receiving body 18 is inserted in the attachment hole 13, the inclined surfaces 20a and 20a are pressed by the opening edge of the attachment hole 13 so that the engage projections 20 and 20 bend inward to be able to pass frontward through the attachment hole 13.

When the engage projections 20 and 20 pass frontward through the attachment hole 13, the inclined surfaces 20a and 20a are no longer pressed so that the engage projections 20 and 20 return to the original states. As a result, the engage faces 20b and 20b engage with the front opening edge of the attachment hole 13, and at the same time the abutting piece 21 abuts on the rear opening edge of the attachment hole 13, allowing the receiving body 18 to be supported on the attaching piece 12. The other two receiving bodies 18 and 18 are likewise supported on the respective attaching pieces 14 and 16.

Each of adjusting screws 22 and 23 has the form of a shaft, and approximately the rear half portion of each screw serves as an engage shaft portion 24. Spherical portions 25 are integrally formed at the front end portions of the adjusting screws 22 and 23. The spherical portions 25 have flat front ends with engage grooves 26 formed therein.

Another adjusting screw 27 also takes the form of a shaft, and its middle portion, excluding the front and rear end portions, serves as an engage shaft portion 28. A spherical portion 29 is integrally formed at the front end portion of the adjusting screw 27, and a head 30 having the shape of a hexagon coupling bolt is integrally formed at the rear end portion of the adjusting screw 27.

The spherical portion 25 of the adjusting screw 22 is rotatably fitted in the recess 19 of the receiving body 18 which is supported by the attaching piece 12 formed on the upper right side as viewed from the front. The spherical portion 25 of the adjusting screw 23 is rotatably fitted in the recess 19 of the receiving body 18 which is supported by the attaching piece 16 formed on the upper left side as viewed from the front. The spherical portion 29 of the adjusting screw 27 is rotatably fitted in the recess 19 of the receiving body 18 which is supported by the attaching piece 14 formed on the lower left side as viewed from the front.

A nut body 31 is formed of a synthetic resin with elasticity such as nylon 6. The nut body 31 has a flange 32 and a cylindrical nut portion 33 protruding rearward from approximately the center of the flange 32.

A projection 34 protrudes from the rear face of the flange 32 in such a way as to surround the nut portion 33, and has a cylindrical shape having an elliptic lateral cross section. Engage pieces 35, 35, . . . are formed in this projection 34. Each engage piece 35 has a slit formed along the edges excluding the rear edge so that it can bend in the direction perpendicular to the axial direction of the projection 34.

A notch 36 is formed in the outer surface of the front end portion of each engage piece 35, and has an outer end protruding from the outer surface of the projection 34. The engage piece 35 has an outer surface 35a which extends from the outer end of the notch 36 to the rear end of the engage piece 35 and which is inclined in such a way as to be flush with the outer surface of the projection 34.

An attachment hole 37 is formed in a vehicle body 38 and has an elliptic shape matching with the outer shape of the projection 34 of the nut body 31.

The projection 34 of the nut body 31 is inserted in the attachment hole 37 from the front. Accordingly, the inclined surfaces 35a of the engage pieces 35 of the nut body 31 are pressed by the edge of the attachment hole 37 so that the engage pieces 35 are bent inward and the outer ends of the notches 36 come flush with the outer surface of the projection 34. As a result, the engage pieces 35 can pass rearward through the attachment hole 37. When the engage pieces 35 pass through the attachment hole 37 up to the notches 36, the rear face of the flange 32 abuts on the front face of the vehicle body 38 and the engage pieces 35 slightly protrude outward, causing the notches 36 to be engaged with the rear opening edge of the attachment hole 37. Consequently, the nut body 31 is attached to the vehicle body 38.

A bracket 39 has cylindrical nut portions 41 and 42 with which the engage shaft portions 24 and 28 of the adjusting screws 23 and 27 are to be engaged, and is formed of a synthetic resin with elasticity like nylon 6. Those nut portions 41 and 42 are integrally provided on a main portion 40 having the shape of an vertically elongated plate in such a way as to protrude rearward from the upper and lower end portions of the main portion 40.

Two cylindrical projections 43 are integrally and protrusively provided at the rear face of the main portion 40 which surrounds the nut portions 41 and 42. Engage pieces 44 are formed on the projections 43.

Each engage piece 44 has a slit formed along the edges excluding the rear edge so that it can bend in the direction perpendicular to the axial direction of the associated projection 43. A notch 45 is formed in the outer surface of the front end portion of each engage piece 44, and has an outer end protruding from the outer surface of the projection 43. The engage piece 44 has an outer surface 44a which extends from the outer end of the notch 45 to the rear end of the engage piece 44 and which is inclined in such a way as to be flush with the outer surface of the projection 43.

An attachment portion 46 integrally protrudes leftward from the upper left edge of the main portion 40, with a support cylinder portion 47 integrally formed at the left end portion of the attachment portion 46. The support cylinder portion 47 has a rectangular cylinder shape whose axial direction extends nearly in the front and back direction and which is shorter in the axial direction than in the up and down direction.

Attachment holes 48 and 48 are formed in the vehicle body 38, apart from each other in the up and down direction, and have circular shapes matching with the outer shapes of the two projections 43 of the bracket 39.

The projections 43 of the bracket 39 are inserted in the attachment holes 48 from the front. Accordingly, the inclined surfaces 44a of the engage pieces 44 of the projections 43 are pressed by the edges of the attachment holes 48 so that the engage pieces 44 are bent inward and the outer ends of the notches 45 come flush with the outer surfaces of the projections 43. This can allow the engage pieces 44 to pass rearward through the attachment holes 48. When the engage pieces 44 pass through the attachment holes 48 up to the notches 45, the rear face of the main portion 40 abuts on the front face of the vehicle body 38 and the engage pieces 44 slightly protrude outward, causing the notches 45 to be engaged with the rear opening edges of the attachment holes 48. Consequently, the bracket 39 is attached to the vehicle body 38.

The engage shaft portion 24 of the adjusting screw 22 is engaged in a selftapped manner with the nut portion 33 of the nut body 31, the engage shaft portion 24 of the adjusting screw 23 is engaged in a selftapped manner with the nut portion 41 of the bracket 39, and the engage shaft portion 28 of the adjusting screw 27 is engaged in a selftapped manner with the nut portion 42 of the bracket 39.

In the actual assembling, the adjusting screws 22, 23 and 27 are engaged with the respective nut portions 33, 41 and 42, the rear openings 19b of the three receiving bodies 18 supported on the head lamp unit 2 are then made to abut on the spherical portions 25, 25 and 29 of the adjusting screws 22, 23 and 27, and the head lamp unit 2 is pressed rearward in this situation to cause the spherical portions 25, 25 and 29 to be rotatably fitted in the recesses 19 of the receiving bodies 18.

The head lamp unit 2 is tiltably supported on the vehicle body 38 in the above-described manner. More specifically, the head lamp unit 2 is tiltably supported on the vehicle body 38 by a rotational support section 49 whose rotational supporting point is the coupling point between the spherical portion 25 of the adjusting screw 23 and the recess 19 of the receiving body 18 which is supported by the upper left attaching piece 16 of the head lamp unit 2, a distance adjuster 50, which comprises the receiving body 18 supported by the upper right attaching piece 12, the adjusting screw 22 and the nut portion 41 of the bracket 39, and a distance adjuster 51, which comprises the receiving body 18 supported by the lower left attaching piece 16, the adjusting screw 27 and the nut portion 42 of the bracket 39.

As the engage shaft portion 24 of the adjusting screw 22 of the distance adjuster 50 is driven into or oat of the nut portion 33 by turning this adjusting screw 22 by means of, for example, a driver whose distal end engaged with the engage groove 26 formed in the front face of the spherical portion 25 from the front via the front opening 19a of the receiving body 18, the distance between the vehicle body 38 and the head lamp unit 2 at that portion changes and the head lamp unit 2 is turned around the rotational axis that is the line connecting the receiving body 18 to which the spherical portion 29 of the adjusting screw 27 is coupled and the aforementioned rotational supporting point. As the adjusting screw 27 of the distance adjuster 51 is driven into or out of the nut portion 42 by turning this adjusting screw 27 by manipulating the head 30 by the proper means, the distance between the vehicle body 38 and the head lamp unit 2 at that portion changes and the head lamp unit 2 is turned around the rotational axis that is the line connecting the receiving body 18 to which the spherical portion 25 of the adjusting screw 22 is coupled and the aforementioned rotational supporting point.

A lamp 52 located on the side of the vehicular head lamp 1 is a width indicator, for example. The lamp 52 has a lamp body 53, and a piece 54 to be supported protrudes from the end portion of the lamp body 53 on the vehicular head lamp side. The distal end of this piece 54 is fitted in the support cylinder portion 47 of the bracket 39 and the other end portion of the lamp body 53 (the opposite end to the vehicular head lamp 1) is secured to the vehicle body 38 by a screw or the like, so that the lamp 52 is supported on the vehicle body 38.

As the attachment portion 46 for supporting the lamp 52 adjacent to the vehicular head lamp 1 is formed on the bracket 39 in the aforementioned manner, the number of required parts can be reduced.

Figure 13:
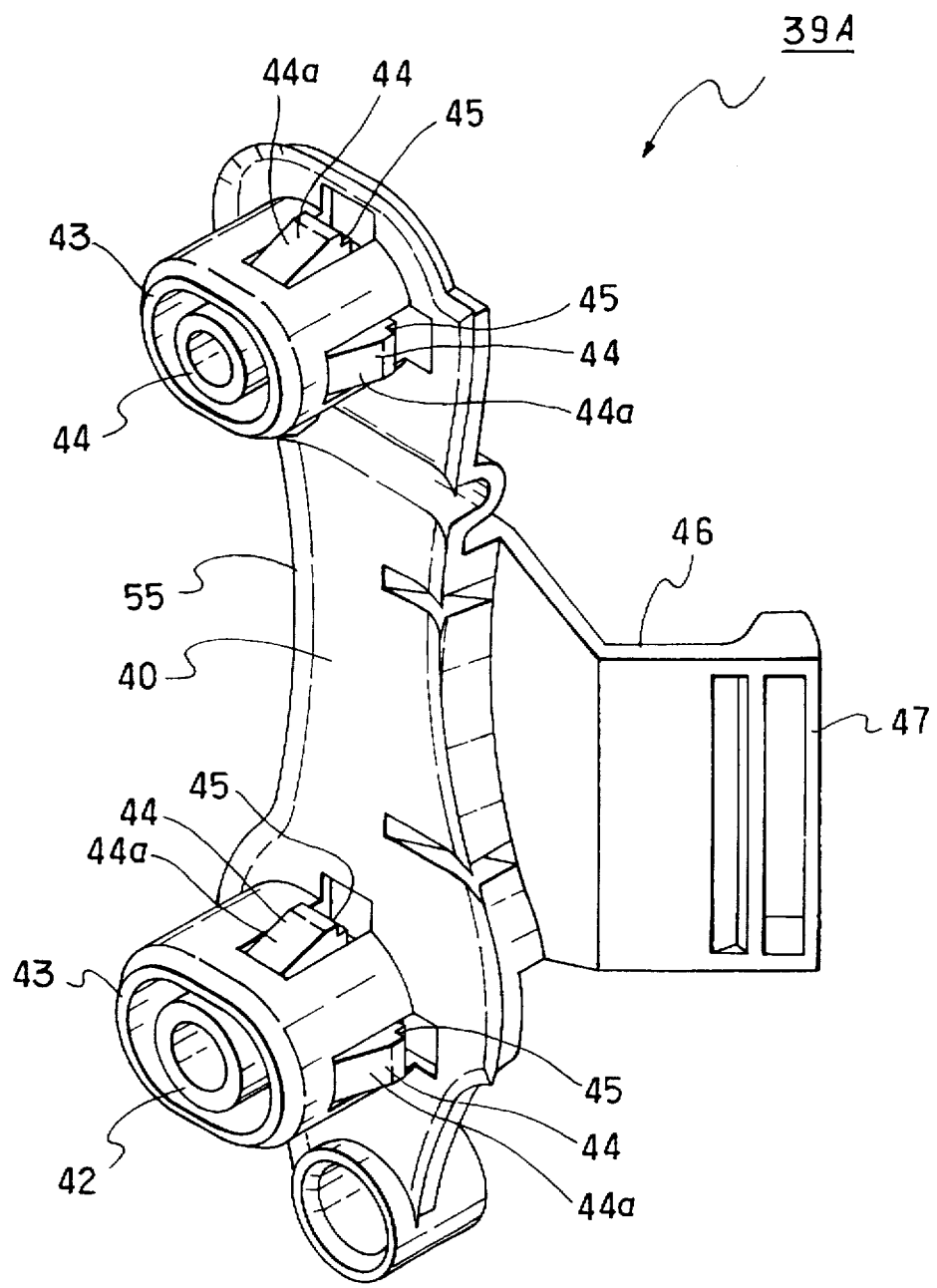
FIG. 13 is an enlarged perspective view showing a modification of the bracket together with FIG. 14.
Figure 14:
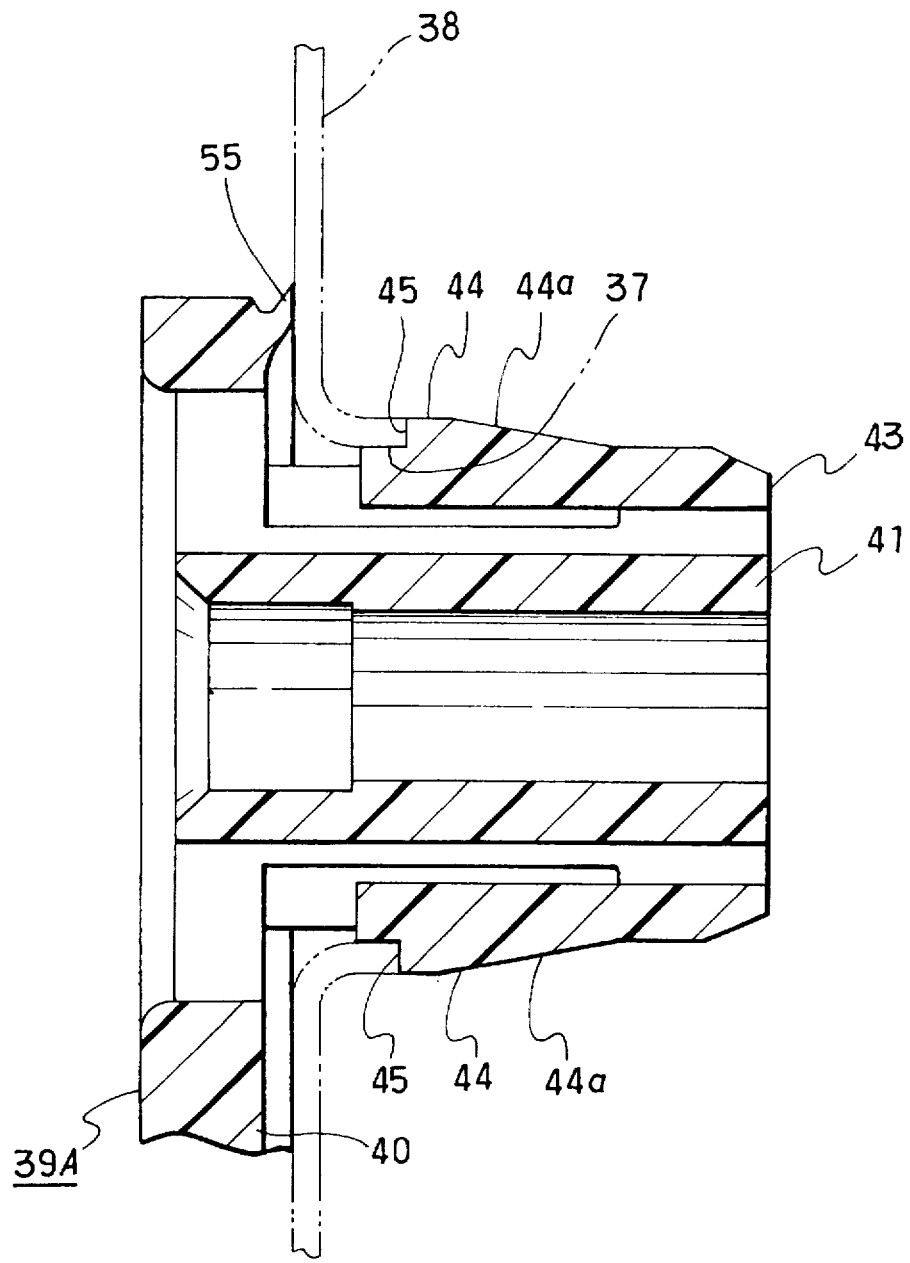
FIG. 14 is an enlarged cross-sectional view of essential portions showing the bracket attached to a vehicle body.

FIGS. 13 and 14 show a modification of the bracket, 39A. This bracket 39A has an elastic contact piece 55 integrally formed at the periphery of the main portion 40 in such a way as to protrude slightly rearward.

When the bracket 39A is attached to the vehicle body 38, therefore, the distal end of the elastic contact piece 55 elastically contacts the front face of the vehicle body 38, thus suppressing the rattling of the bracket 39A.

Figure 15:
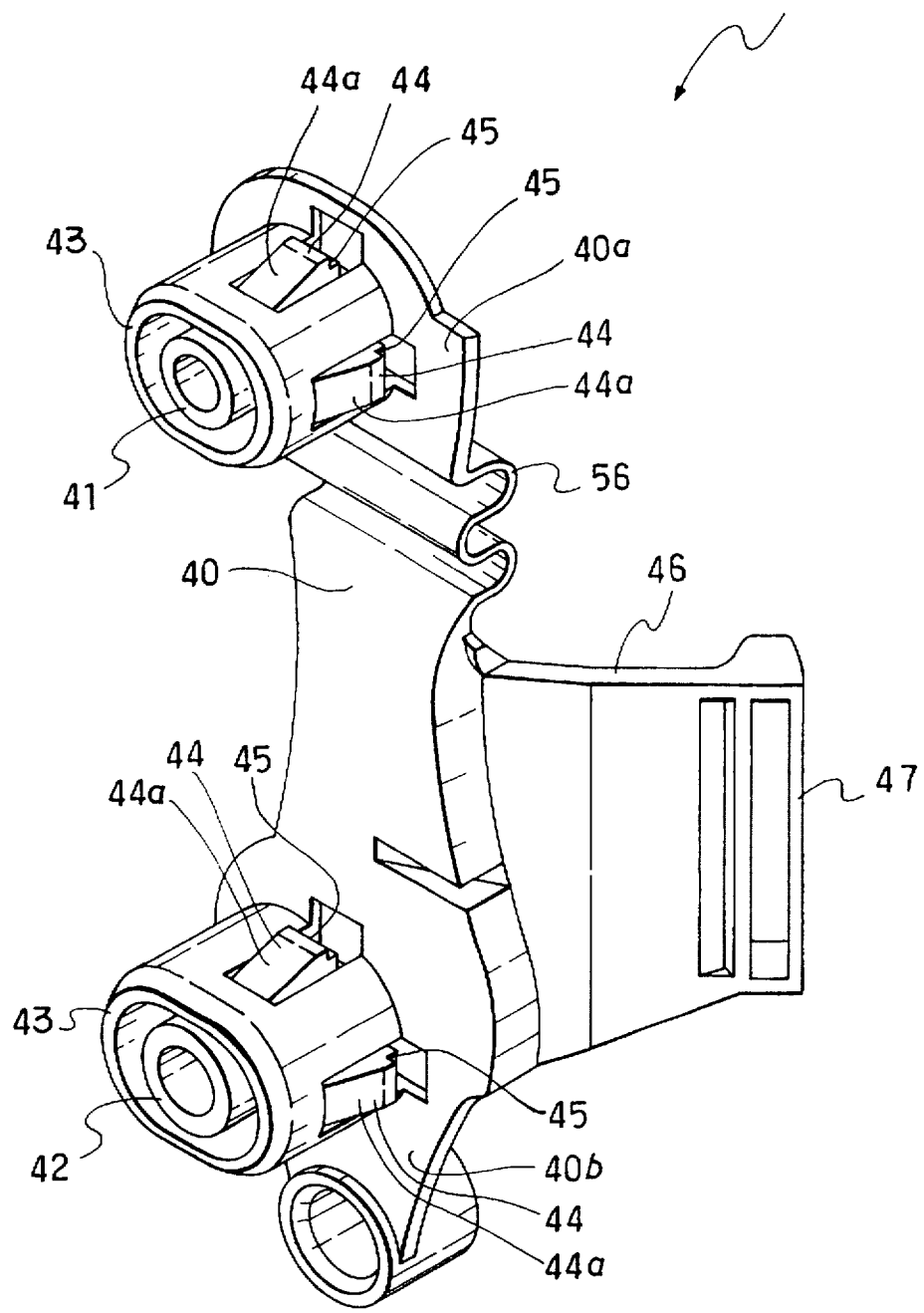
FIG. 15 is an enlarged perspective view showing another modification of the bracket together with FIG. 16.
Figure 16:
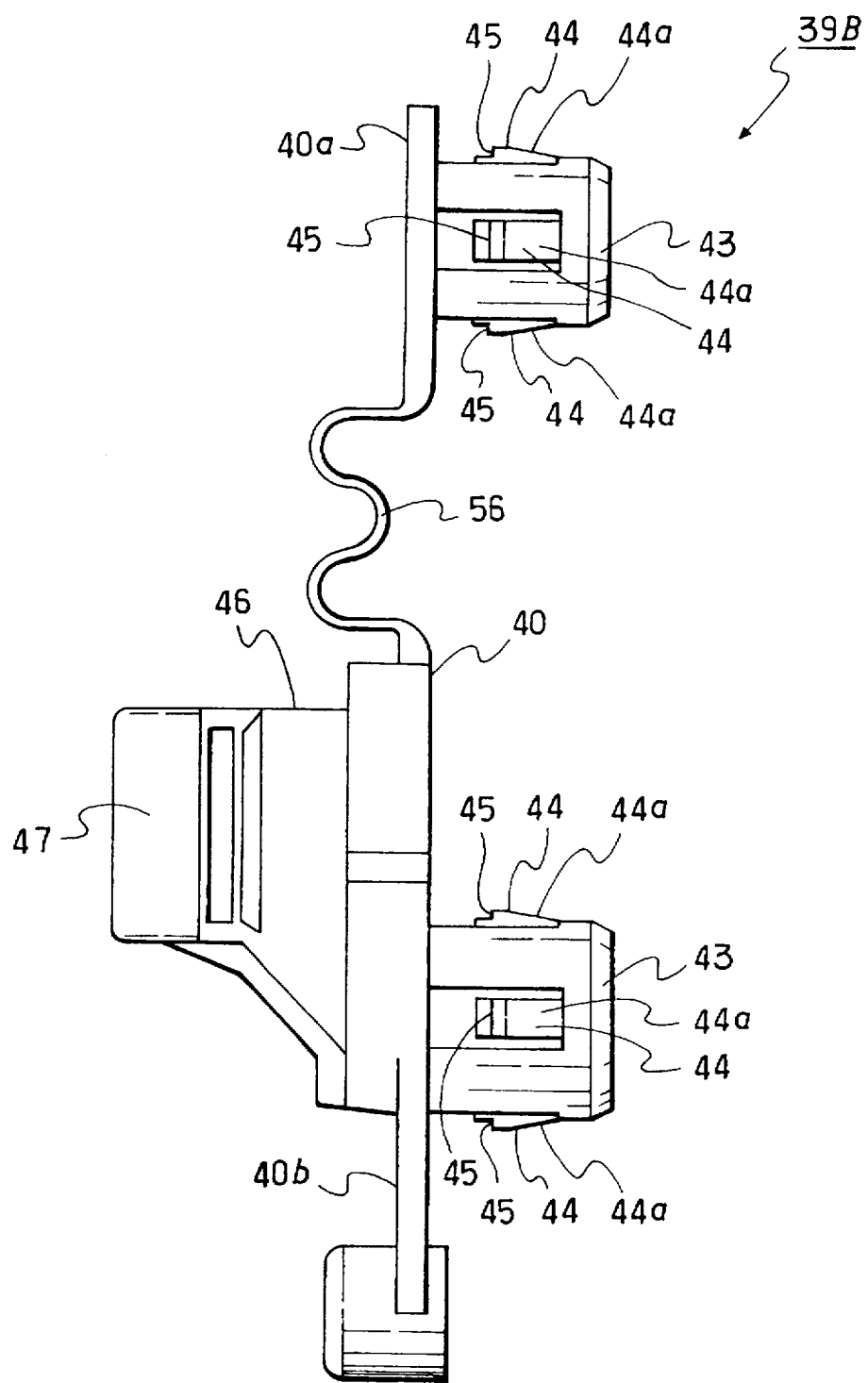
FIG. 16 is an enlarged side view.
Figure 17:
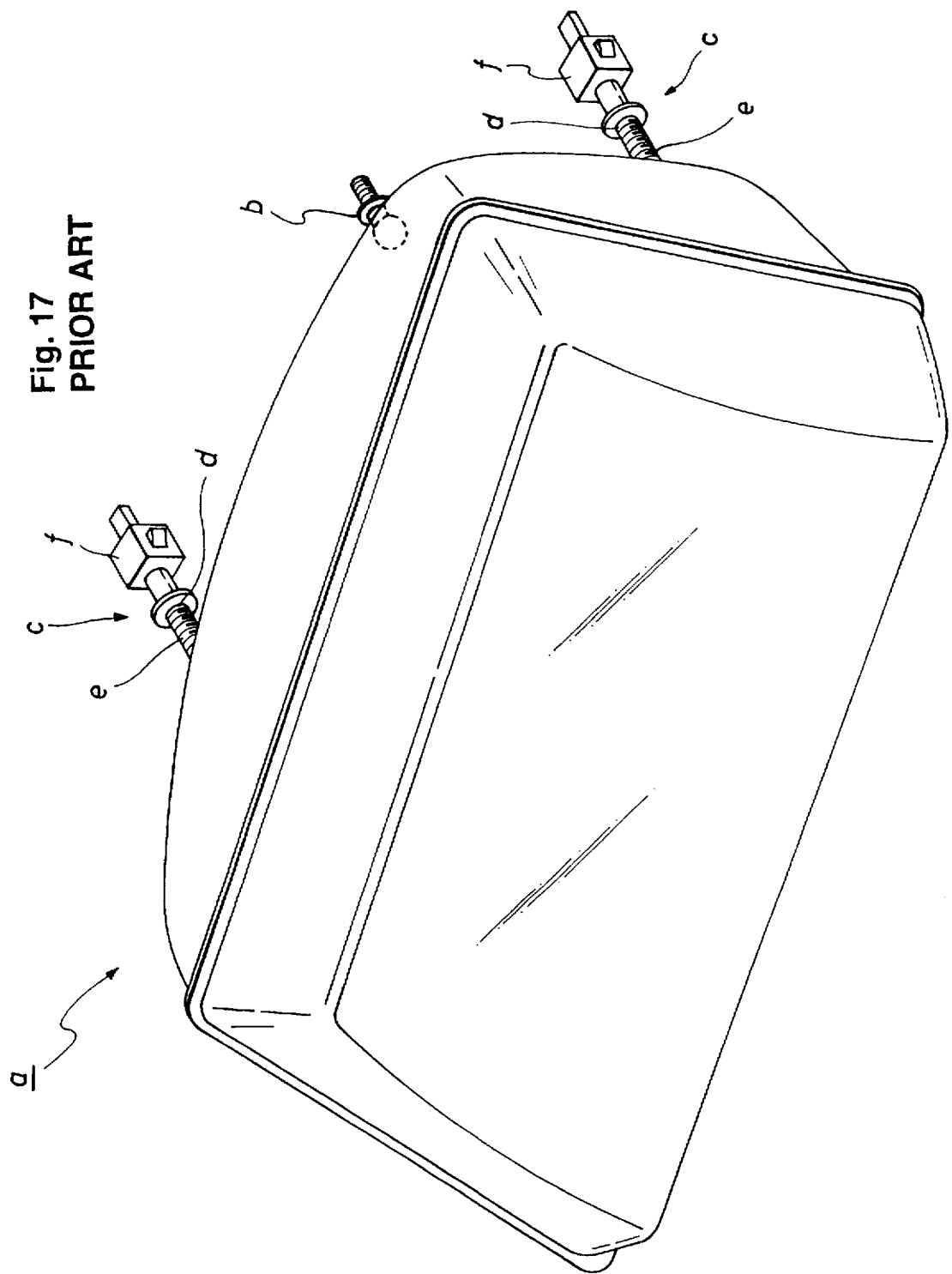
FIG. 17 is a schematic perspective view exemplifying a conventional vehicular head lamp.

FIGS. 15 and 16 show another modification of the bracket, 39B. This bracket 39B has a thin elastic coupling portion 56 having a bellows shape, which integrally couples a portion 40a of the main portion 40 where the nut portion 41 is formed and a portion 40b where the nut portion 42 is formed.

Even if there is a slight misalignment of the attachment holes 37 for receiving the projections 43 at the time the bracket 39B is attached to the vehicle body 38, therefore, the elastic coupling portion 56 deforms to absorb the misalignment, thus ensuring the easy attachment of the bracket 39B to the vehicle body 38.

As apparent from the above description, the vehicular head lamp according to this invention has a head lamp unit tiltabaly attached to a vehicle body by means of two distance adjusters including adjusting shafts and one rotational support section, and is characterized in that the two adjusting shafts are coupled to the vehicle body via a bracket of a synthesized resin which has two nuts that are to be respectively fitted over the two adjusting shafts, and projections protruding toward the vehicle body are formed on nut-forming portions and are engaged with attachment holes formed in the vehicle body to secure the bracket to the vehicle body.

Therefore, the attachment of the vehicular head lamp of this invention to the vehicle body merely requires the attachment of a single bracket to the vehicle body, thus ensuring higher assembling efficiency. Further, as two projections are attached to the vehicle body, the nuts do not turn in accordance with the rotation of the adjusting shafts even if the attachment holes are not made non-circular. Furthermore, the bracket can be attached to the vehicle body so long as the rough, not precise, positional relation between them is grasped, thus ensuring significantly remarkable assembling efficiency.

The shapes and structures of the individual parts of the illustrated embodiment are to be considered as illustrative and not restrictive and the invention is not to be limited to the details given herein, but may be modified within the scope of the appended claims.

What is claimed is:

1. A vehicular headlamp for a vehicle body having attachment holes for mounting the headlamp, the headlamp comprising:

a head lamp unit;

two distance adjusters including two threaded adjusting shafts, and one rotational support section including another threaded adjusting shaft, said two threaded adjusting shafts and said another threaded adjusting shaft being pivotally connected to said head lamp unit; and a bracket having two female threaded portions respectively threadably engaged with one of said two threaded adjusting shafts and with said another threaded adjusting shaft, said one of said two threaded adjusting shafts and said another threaded adjusting shaft being coupled to the vehicle body via said bracket, wherein said bracket comprises two projections protruding rearward toward the vehicle body, said projections being engageable with the attachment holes formed in the vehicle body to secure said bracket to the vehicle body.

2. The vehicular headlamp according to claim 1, wherein said bracket has an elastic portion between said two nuts.

3. The vehicular head lamp according to claim 2, wherein said elastic portion is thin and has a bellows shape.

4. The vehicular head lamp according to claim 1, wherein said bracket has an elastic contact piece at a periphery of a surface of said bracket which contacts the vehicle body.

5. The vehicular head lamp according to claim 2, wherein said bracket has an elastic contact piece at a periphery of a surface of said bracket which contacts the vehicle body.

6. The vehicular head lamp according to claim 3, wherein said bracket has an elastic contact piece at a periphery of a surface of said bracket which contacts the vehicle body.

7. The vehicular head lamp according to claim 4, wherein said elastic contact piece protrudes slightly rearward toward the vehicle body.

8. The vehicular head lamp according to claim 1, wherein said bracket has a main portion having a shape of a vertically elongated plates, and wherein said two projections have a cylindrical shape.

9. The vehicular head lamp according to claim 8, wherein said two projections are integrally formed with said main portion, and said two projections protrude rearward from upper and lower end portions of said main portion.

10. The vehicular head lamp according to claim 1, wherein said bracket is made of nylon.

11. The vehicular head lamp according to claim 1, wherein an attachment portion for supporting another lamp adjacent to said vehicular head lamp is formed on said bracket.

12. The vehicular head lamp according to claim 1, wherein said bracket is made of synthetic resin.

13. The vehicular head lamp according to claim 1, wherein said female threaded portions have a substantially cylindrical outer surface.

14. The vehicular head lamp according to claim 1, wherein each one of said projections surrounds a corresponding one of said female threaded portions.

15. The vehicular head lamp according to claim 1, wherein said projections and said female threaded portions are coaxial.

16. A vehicular headlamp for a vehicle body having attachment holes for mounting the headlamp, the headlamp comprising:

a head lamp unit;

two distance adjusters and one rotational support section, said two distance adjusters and said one rotational support section each including a threaded adjusting shaft pivotally connected to said head lamp unit; and a bracket having two female threaded portions respectively threadably engaged with two of said adjusting shafts, wherein said bracket comprises two projections protruding rearward toward the vehicle body, said projections being engageable with the attachment holes formed in the vehicle body to secure said bracket to the vehicle body.

* * * * *